United States Patent
Khan

(10) Patent No.: US 11,146,505 B2
(45) Date of Patent: Oct. 12, 2021

(54) LOW LATENCY COMPACT CLOS NETWORK CONTROLLER

(71) Applicant: Intel Corporation, Santa Clara, CA (US)

(72) Inventor: Faisal Khan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 15/868,398

(22) Filed: Jan. 11, 2018

(65) Prior Publication Data

US 2019/0044885 A1 Feb. 7, 2019

(51) Int. Cl.
*H04L 12/933* (2013.01)
*H04L 12/863* (2013.01)

(52) U.S. Cl.
CPC ...... *H04L 49/1569* (2013.01); *H04L 47/6245* (2013.01); *H04L 49/101* (2013.01); *H04L 49/1576* (2013.01)

(58) Field of Classification Search
CPC ............. H04L 49/1569; H04L 49/1576; H04L 49/101; H04L 47/6245
See application file for complete search history.

(56) References Cited

U.S. PATENT DOCUMENTS

| | | | | |
|---|---|---|---|---|
| 5,544,160 | A * | 8/1996 | Cloonan | H04L 12/5601 370/395.1 |
| 5,724,352 | A * | 3/1998 | Cloonan | H04L 12/5601 370/388 |
| 2004/0264448 | A1* | 12/2004 | Wise | H04L 49/1553 370/386 |
| 2012/0170582 | A1* | 7/2012 | Abts | H04L 45/06 370/392 |
| 2015/0003477 | A1* | 1/2015 | Baeckler | H04L 25/14 370/503 |
| 2015/0341037 | A1* | 11/2015 | Schulz | H03K 19/1735 326/41 |
| 2017/0257328 | A1* | 9/2017 | Anand | H04L 47/26 |
| 2018/0139139 | A1* | 5/2018 | Shen | H04L 45/74 |
| 2018/0183524 | A2* | 6/2018 | Rickman | H04Q 11/0066 |
| 2018/0183720 | A1* | 6/2018 | Shpiner | H04L 47/39 |
| 2019/0028185 | A1* | 1/2019 | Tomasicchio | H04B 7/2041 |
| 2019/0245803 | A1* | 8/2019 | Hu | H04L 43/0882 |

* cited by examiner

*Primary Examiner* — Brian D Nguyen
(74) *Attorney, Agent, or Firm* — Fletcher Yoder, P.C.

(57) ABSTRACT

Many network protocols, including certain Ethernet protocols, include specifications for multiplexing using of virtual lanes. Due to skews and/or other uncertainties associated with the process, packets from virtual lanes may arrive at the receiver out of order. The present disclosure discusses implementations of receivers that may use multiplexer based crossbars, such as Clos networks, to reorder the lanes. State-based controllers for the Clos networks and state-based methods to assign routes in are also discussed.

22 Claims, 12 Drawing Sheets

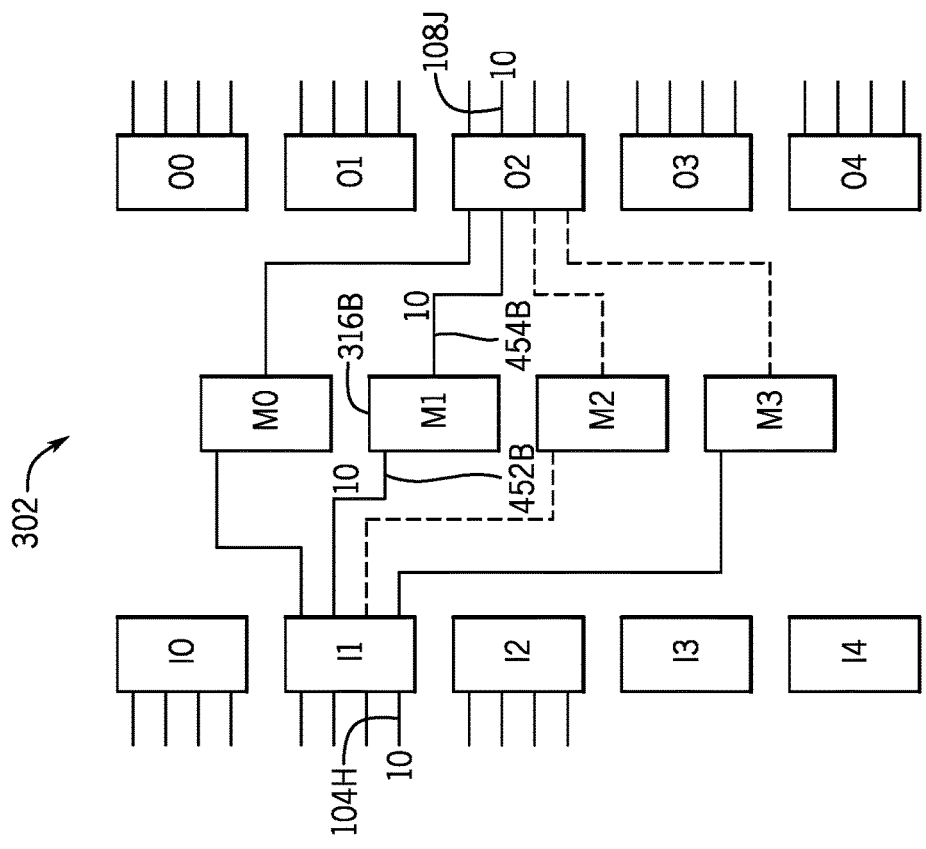
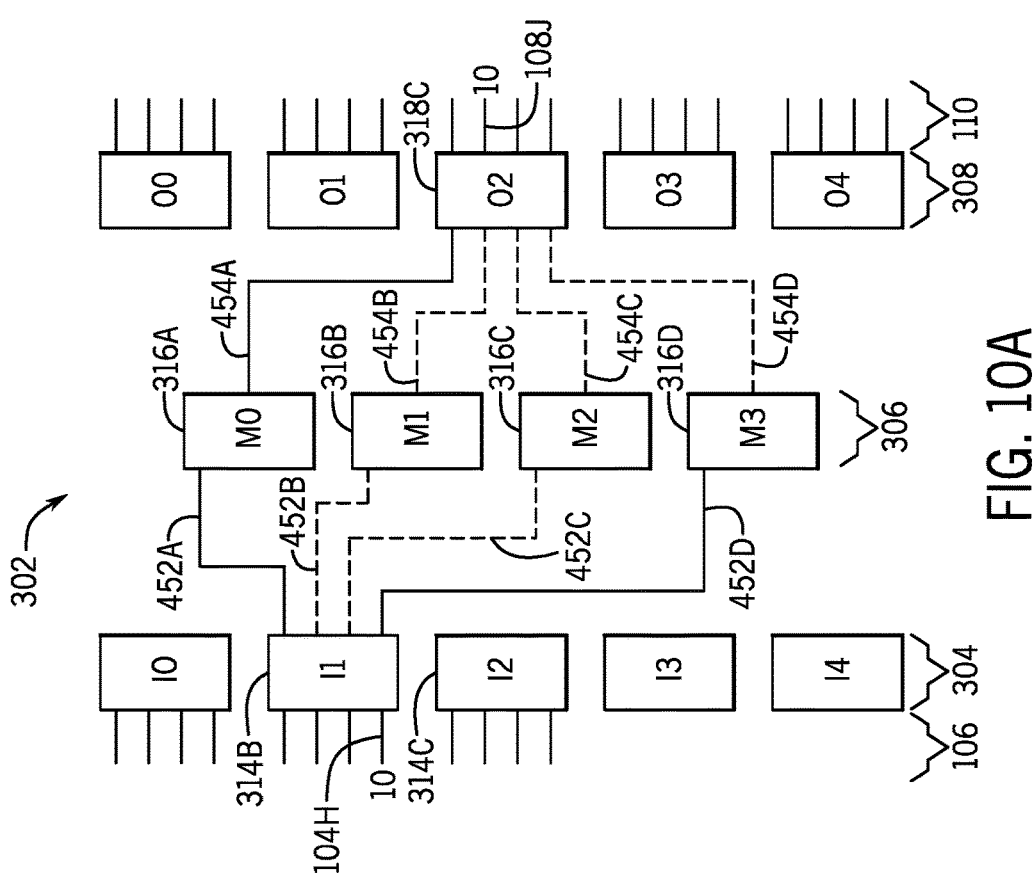
FIG. 10B
FIG. 10A

LOW LATENCY COMPACT CLOS NETWORK CONTROLLER

BACKGROUND

This disclosure relates to data distribution circuitry for multi-channel communication, and more specifically, to methods and systems for reordering of multi-channel data using programmable integrated circuit devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Electronic devices may communicate with other electronic devices using a shared network infrastructure. In several networks, such as 100 Gigabit Ethernet (100 GE) networks and/or 40 Gigabit Ethernet (40 GE) networks, the protocol may allow multiplexed data transmission using physical channels, and virtual lanes that may be mapped to the physical channels. The virtual lanes may arrive at the receiver in an arbitrary order, due in part to the physical channel skews. As a result, network receivers may include circuitry that may reorder the virtual lanes for proper data processing.

BRIEF DESCRIPTION OF THE DRAWINGS

Various aspects of this disclosure may be better understood upon reading the following detailed description and upon reference to the drawings in which:

FIG. 10A is a first diagram of an example of a forward search of routes in the Clos network, in accordance with an embodiment;

FIG. 10B is a second diagram of the forward search example of FIG. 10A, in accordance with an embodiment;

DETAILED DESCRIPTION OF SPECIFIC EMBODIMENTS

Figure 1:
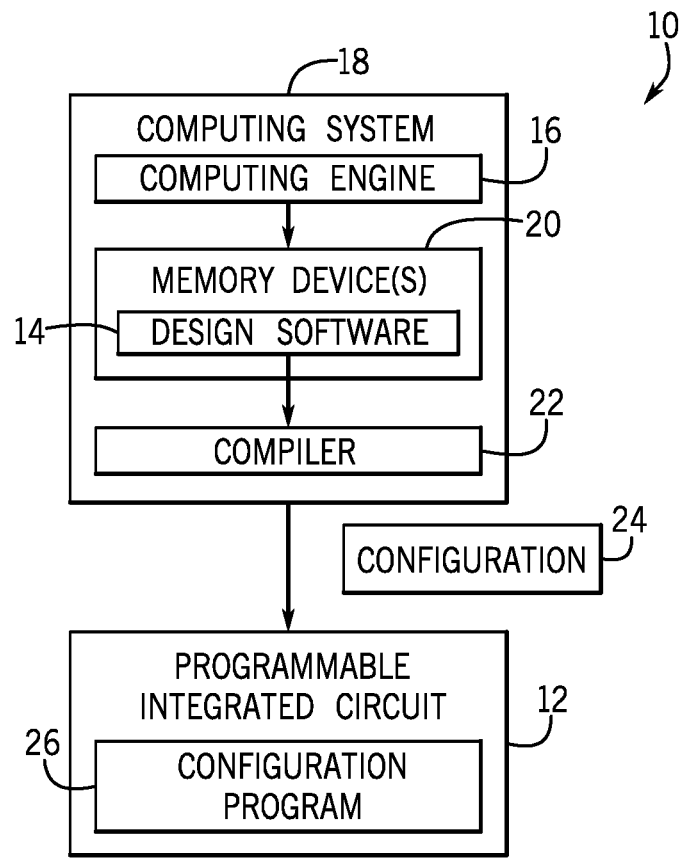
FIG. 1 is a block diagram of a system that may be used to implement network circuitry that includes lane reordering circuitry, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Network protocols may allow multiplexed data distribution using virtual lanes that may be mapped to physical channels. Examples include the 100 Gigabit Ethernet (100 GE) protocol and/or the 40 Gigabit Ethernet protocol (40 GE), which may allow virtual lanes that may be mapped to physical channels. In Ethernet systems, virtual lanes may be the interface presented to a data link layer by the physical layer. Physical channels may be the interface between the physical layer and the network medium, which may be a coper wire, an optic fiber channel, or a radio frequency (RF) channel. As an example, a 100 GE implementation may allow 20 virtual lanes that may be mapped to four or ten physical channels. As a further example, a 40 GE implementation may include four virtual lanes that may be mapped to two or four physical channels.

As different physical channels may present different skews, the above-described mapping may lead to the virtual lanes arriving out of order. Lane reordering circuitry may be used in the receiver to reorder the virtual lanes, which facilitates proper recovery of the data received. Embodiments described herein are related to lane reordering circuitry that may employ crossbars and/or multiplexers that may be arranged in stages. The multiplexers and/or the crossbars may be programmed to create routes between input ports and output ports of the lane reordering circuitry to provide the lane reordering.

Examples of virtual lane reordering circuitry that uses crossbars may include systems using single stage crossbars and two-stage ingress/egress crossbar architectures. Systems may also employ a Clos network, a three-stage crossbar architecture having an ingress stage, a middle stage, and an egress stage. The routes within a lane reordering circuit may be determined by the configuration of each multiplexer and/or crossbar. In certain implementations, a Clos network controller may be used to configure each multiplexer and/or crossbar of the Clos network. Dynamic configuration of multiplexers by the Clos network controller may be challenging. The configuration of the crossbars of a Clos network may be solved using a backtracking and recursive algorithm. However, software-based implementations of Clos network controllers using these algorithms may be slow, and thus, may be unfeasible. The present disclosure discusses methods for implementing hardware-based Clos networks and Clos network controllers, using state-machine controllers as well as specific data structures that allow practical implementations of Clos networks controllers for large Clos networks.

It should be noted that, while the Clos networks and the Clos network controllers are being described in the context of virtual lane reordering for data communication receivers, the methods and systems described herein may be used to create hardware-based implementations of Clos network controllers that may handle any Clos network. Moreover, while the examples provided herein describe Clos networks that implement 20×20 crossbars for 100 GE networks, the Clos network controllers may be used to control Clos network of any dimensions. It should also be understood that the strategies described herein may modified to be used in any system for distributing data or assigning routes, as understood in the art.

With the foregoing in mind, FIG. 1 is a block diagram of a system 10 that may be used to implement Clos networks and/or Clos network controllers in an integrated circuit 12, such as an application-specific integrated circuit (ASIC) or a programmable integrated circuit such as a field programmable gate array (FPGA). The Clos network and/or the Clos network controller may be part of the receiver circuitry, as detailed below. A user may implement a circuit design to be programmed onto the integrated circuit 12 using design software 14, such as a version of Quartus by Intel Corporation.

The design software 14 may be executed by a computing engine 16 of a computing system 18. The computing system 18 may include any suitable device capable of executing the design software 14, such as a desktop computer, a laptop, a mobile electronic device, a server, and the like. The computing system 18 may access, configure, and/or communicate with the integrated circuit 12. The computing engine 16 may include any suitable components, circuitry, or logic, which may execute machine-readable and/or processor-executable instructions (e.g., firmware or software), including instructions to implement a Clos network and/or a Clos network controller. For example, the computing engine 16 may include one or more processors (e.g., multiple microprocessors), one or more other integrated circuits (e.g., application specific integrated circuits, field programmable gate arrays, reduced instruction set processors, and the like), an array of multipliers and/or logic devices, or some combination thereof.

One or more memory devices 20 may store the design software 14. In addition, the memory device(s) 20 may store information related to the integrated circuit 12, such as control software, configuration software, look up tables, configuration data, etc. In some embodiments, the computing engine 16 and/or the memory device(s) 20 may be external to the computing system 18. The memory device(s) 20 may include a tangible, non-transitory, machine-readable-medium, such as a volatile memory (e.g., a random access memory (RAM)) and/or a nonvolatile memory (e.g., a read-only memory (ROM)). The memory device(s) 20 may store a variety of information and be used for various purposes. For example, the memory device(s) 20 may the store machine-readable and/or processor-executable instructions (e.g., firmware or software) for the computing engine 16 to execute, such as instructions to implement the crossbars of a Clos network controller and/or a state-machine logic associated with the Clos network controller. The memory device(s) 20 may include one or more storage devices (e.g., nonvolatile storage devices) that may include read-only memory (ROM), flash memory, a hard drive, or any other suitable optical, magnetic, or solid-state storage medium, or any combination thereof.

The design software 14 may use a compiler 22 to generate a low-level circuit-design configuration 24 for the integrated circuit 12. The configuration 24 may include a number of formats, such as a program object file, bitstream, or any other suitable format, which may configure the integrated circuit 12. That is, the compiler 22 may provide machine-readable instructions representative of the circuit design to the integrated circuit 12. For example, the integrated circuit 12 may receive one or more configurations 24 that describe hardware configurations that implement a Clos network and/or a Clos network controller in the integrated circuit 12. In some embodiments, the configuration 24 may be programmed into the integrated circuit 12 as a configuration program 26.

Figure 2:
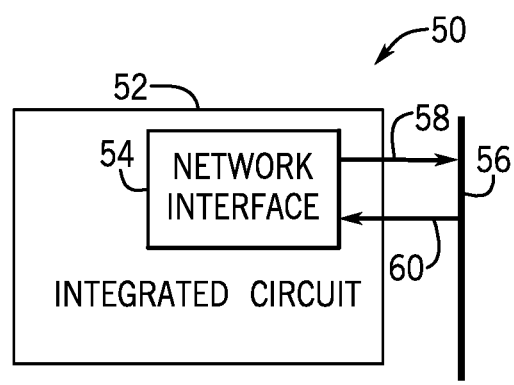
FIG. 2 is a block diagram of an electronic device that may connect to a network using network circuitry that includes lane reordering circuitry, in accordance with an embodiment.

The integrated circuit 12 may be used to implement portions of the network circuitry, as discussed above. System 50 in FIG. 2 illustrates an electronic device 52 that may include a network interface 54. The network interface 54 may facilitate interactions between the electronic device 52 and the network physical channel 56. For example, the network interface 54 may implement circuit and/or logic for a physical coding sublayer (PCS) circuit. The PCS circuitry may have a transmission logic that may produce data to be transmitted over multiple virtual lanes via a TX path (arrow 58), and reception logic that may receive data from a RX path (arrow 60) and may, among other things, reorder virtual lanes received from the physical channel 56. The PCS circuitry may be implemented using programmable fabric, such as an FPGA, hardened circuitry, such as application-specific integrated circuit (ASIC), or hybrid integrated circuits including both programmable fabric and hardened circuitry.

Figure 3:
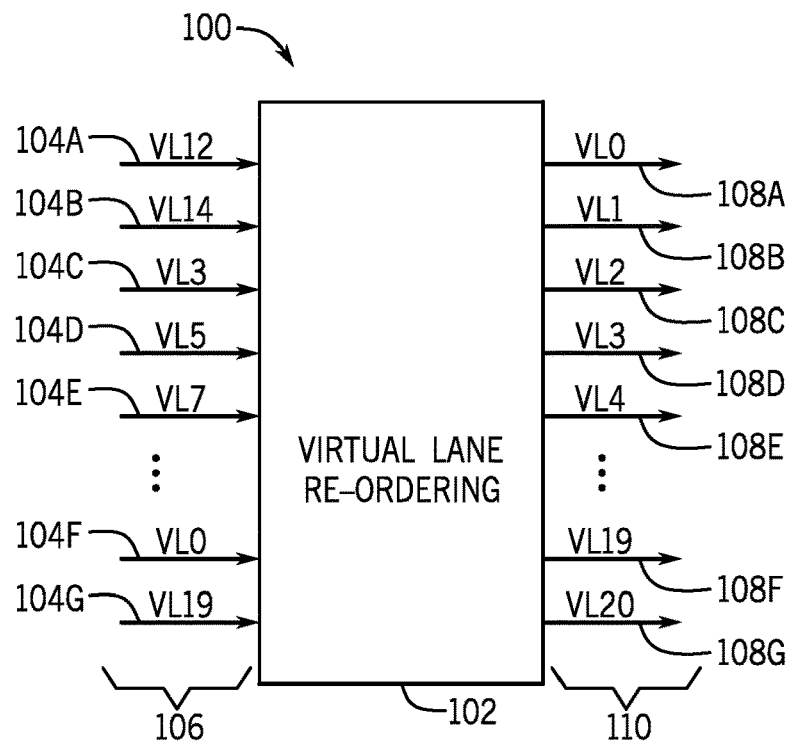
FIG. 3 is a block diagram of a lane reordering circuitry, in accordance with an embodiment.

The diagram 100 in FIG. 3 illustrates a virtual lane reordering block 102. The lane reordering block 102 circuitry may be a component of a RX PCS circuitry. Lane reordering block 102 may receive incoming virtual lanes 106, such as virtual lanes 104A, 104B, 104C, 104D, 104E, 104F, and 104G. In the illustrated example lane reordering block 102 receives 20 virtual lanes 106. The lane reordering block 102 may produce ordered virtual lanes 110, such as virtual lanes 108A, 108B, 108C, 108D, 108E, 108F, and 108G. As discussed above, the specific number of lanes may depend on the protocol implemented by the RX PCS circuitry, and may be of any number. The lane reordering block 102 may receive the incoming virtual lanes 106 out of order. For example, virtual lane 104A may contain the 13th virtual lane (VL12) instead of the 1st virtual lane (VL0). Thus, the lane reordering block 102 routes each virtual the output that provides a proper order. As a result, in the ordered virtual lanes 110, the virtual lane 108A is the 1st virtual lane (VL0), virtual lane 108B is the 2nd virtual lane (VL1), etc.

Figure 4:
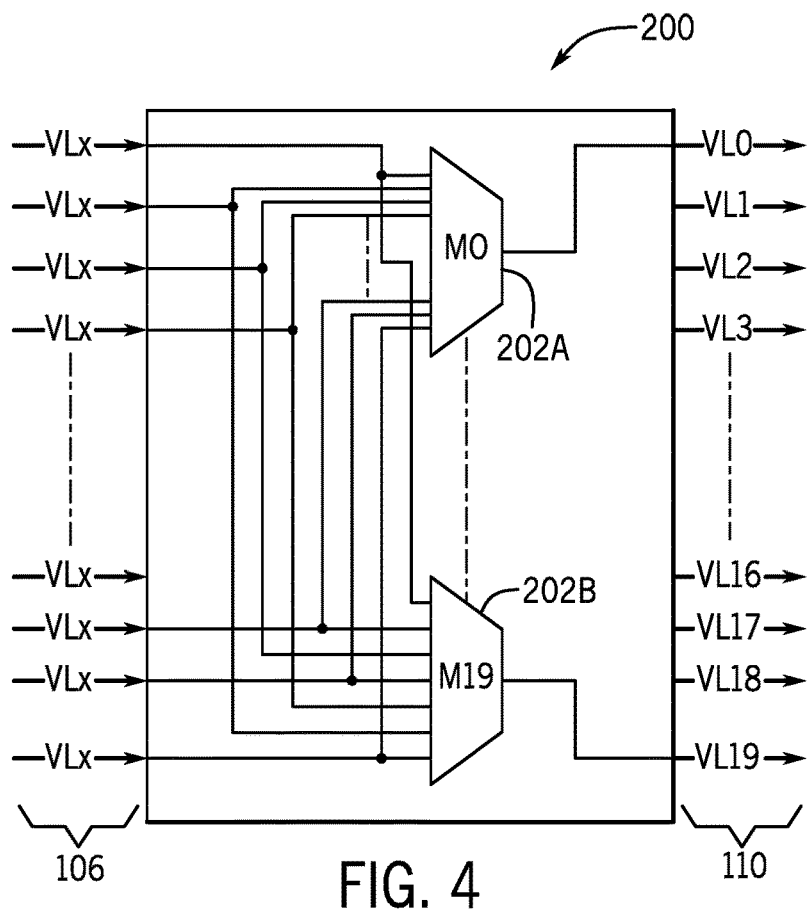
FIG. 4 is a diagram of a single stage crossbar for lane reordering, in accordance with an embodiment.

An implementation of a lane reordering block includes the single-stage crossbar 200, illustrated in FIG. 4. The single-stage crossbar 200 may have N multiplexers in an N×1 configuration to route N packages, which may be virtual lanes. In the illustrated example, the crossbar 200 receives 20 incoming virtual lanes 106 to produce 20 ordered virtual lanes 110. In the example, the lane reordering block 200 may have 20 multiplexers, such as the first multiplexer 202A and the 20th multiplexer 202B. Each multiplexer may be a 20×1 multiplexer, forming the 20×20 crossbar 200. Each multiplexer 202 may receive all 20 inputs from all incoming virtual lanes 106, and may have one output. The first multiplexer 202A may provide the first output (VL0), a second multiplexer may provide the second output (VL1), etc., up until the 20th multiplexer 202B, which may provide the 20th output (VL19). As such, a controller for the single-stage crossbar 200 may configure each multiplexer, which is associated to an output, with the corresponding requested input. For example, if the i-th virtual lane arrives at the j-th input, the i-th multiplexer of the crossbar stage 204 may select its j-th input. The single stage crossbar 200, may be used in ASIC implementations of network receivers.

Implementations of the circuitry in ASICs or in programmable logic devices may be facilitated by the use of libraries, which may include standardized circuitry, soft intellectual property (IP) blocks, or hard IP blocks. When implementing a single stage crossbar in programmable logic devices, the available libraries may not have the large multiplexers (e.g., more than 8-10 inputs), which results in substantial challenge when implementing a single stage crossbar 200 architecture. Moreover, ASIC implementations of single stage crossbars 200 with a very large number of inputs and outputs (e.g., N×N crossbars with N greater than 200) may employ large multiplexers N×1, which may not be available in standard libraries for ASICs. As a result of the lack of large multiplexers, multi-stage crossbars that may employ smaller multiplexers, such as the two-stage architecture or the three-stage architecture described below, may be used.

Figure 5:
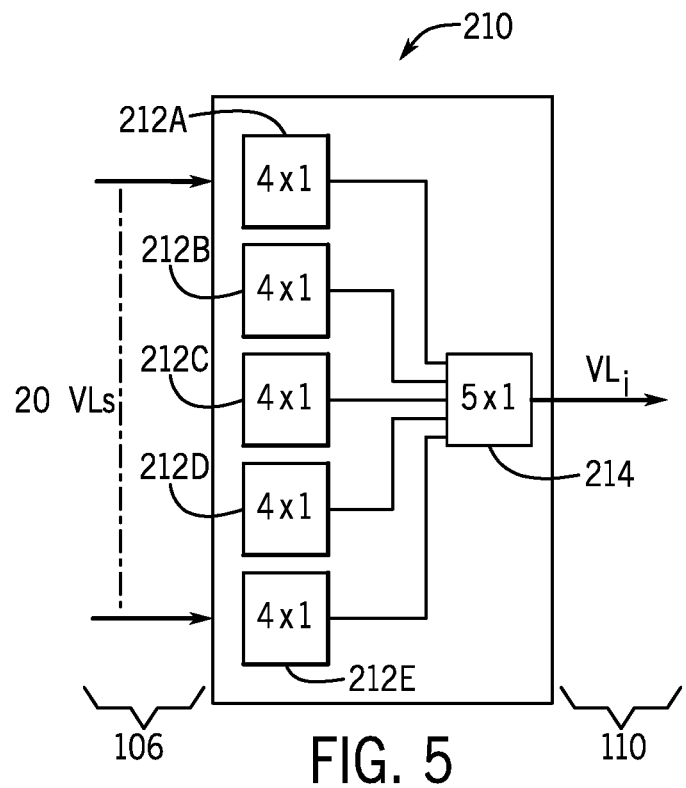
FIG. 5 is a diagram of a two-stage crossbar for lane reordering, in accordance with an embodiment.

A two-stage design, such as the two-stage crossbar 210 illustrated in FIG. 5, may be used in situations where the dimensions of the available multiplexers are smaller than the number of inputs and outputs for the crossbar. In this system, the two stage crossbar 210 may have an ingress stage 216 having N M×1 ingress multiplexers (in this example, 5 4×1 multiplexers 212A, 212B, 212C, 212D, and 212E), and an egress stage 218 with an N×1 egress multiplexer (in this example, 1 5×1 multiplexer 214). It should be noted that the product of M and N may be the number of lanes reordered (in this example, N=5, M=4, M×N=20) by the two-stage crossbar 210. A controller for the two-stage crossbar 210 may operate by employing a simple addressing mechanism to route the package adequately. For example, when the i-th virtual lane should be produced by the multiplexer 214, and the i-th virtual lane arrives at the j-th input of the two-stage crossbar 210, a controller may employ a simple addressing scheme having a=j mod M and b=floor (j/M) to identify the multiplexers to be used. The b-th multiplexer in the first stage 216 may activate the a-th input, and the multiplexer in the second stage 218 may activate the b-th input. This design may be used when the components that are available in an ASIC and/or an FPGA library are not large enough to implement a single-stage crossbar architecture such as crossbar 200 of FIG. 4. However, the larger number of stages may lead to a logic overhead that may result from timing constraints from the addressing scheme of the multiplexers. Moreover the number of interconnects may make close timing (i.e., identify paths that satisfy the timing constraints during the design) challenging for a compiler.

Figure 6:
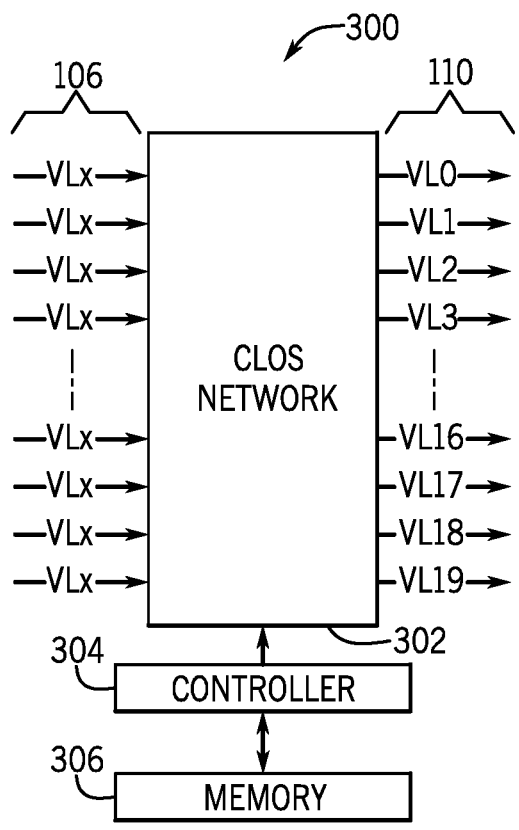
FIG. 6 is a block diagram of a Clos network system which includes a Clos network and a Clos network controller, and may be used for lane reordering, in accordance with an embodiment.

As described herein, a feasible design for a fast N×N crossbar in both ASIC and/or FPGA circuitry may be obtained using a 3-stage crossbar, or a Clos network. The Clos network may be controlled (i.e., programming of the multiplexers and/or crossbars of the Clos network) using a Clos network controller. As discussed above, Clos network controllers implemented using software executed by general-purpose processors may be slow. Thus, a dedicated, hardware-based Clos network controller may be used to facilitate the use of dynamically reconfigurable Clos networks. With the foregoing in mind, the diagram 300 in FIG. 6 illustrates a Clos network 302 that may receive incoming virtual lanes 106 and may produce ordered virtual lanes 110. As detailed below, the Clos network 302 may include crossbars that may be configured by a state-machine based Clos network controller 305, which may implement a backtracking recursive strategy to identify adequate routes. In solutions implementing backtracking, the controller 305 may use a memory 307 to store data structures use to prevent infinite loops and to track tested routes, as detailed below.

Figure 7:
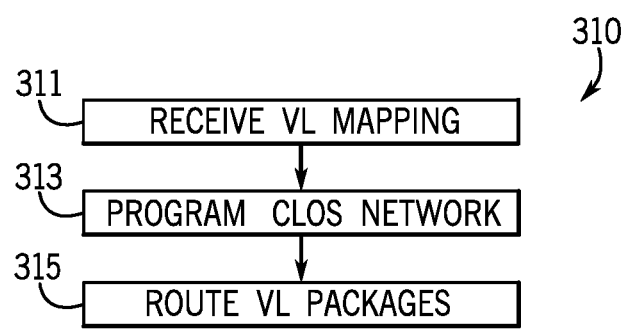
FIG. 7 is a flow chart of a method for controlling a Clos network, in accordance with an embodiment.

The flow chart 310, of FIG. 7, provides an overview of the processes performed by the system 300. In a block 311, the controller 305 of the Clos network 302 may receive the virtual lane mapping, which may specify which input should be routed to which output. In a block 313, the controller 305 may perform operations using its state machine to determine the configuration of the multiplexers in the system. The operation may include a backtracking recursive algorithm. As briefly discussed above, the Clos network controllers may employ specific data structures such as availability vectors, assignment stacks, and/or backtracking vectors to improve the performance of the present implementation As a result of the use of the data structures and the state machine described herein, hardware-based implementations of Clos network controllers, may be used to control Clos networks 302 with very large numbers of inputs and outputs (e.g., from 10 to over 1000 inputs and outputs) using the recursive backtracking algorithm. Once the controller 305 configures the crossbars in Clos network 302, the Clos network may route packages and reorder the lanes in block 315.

Figure 8A:
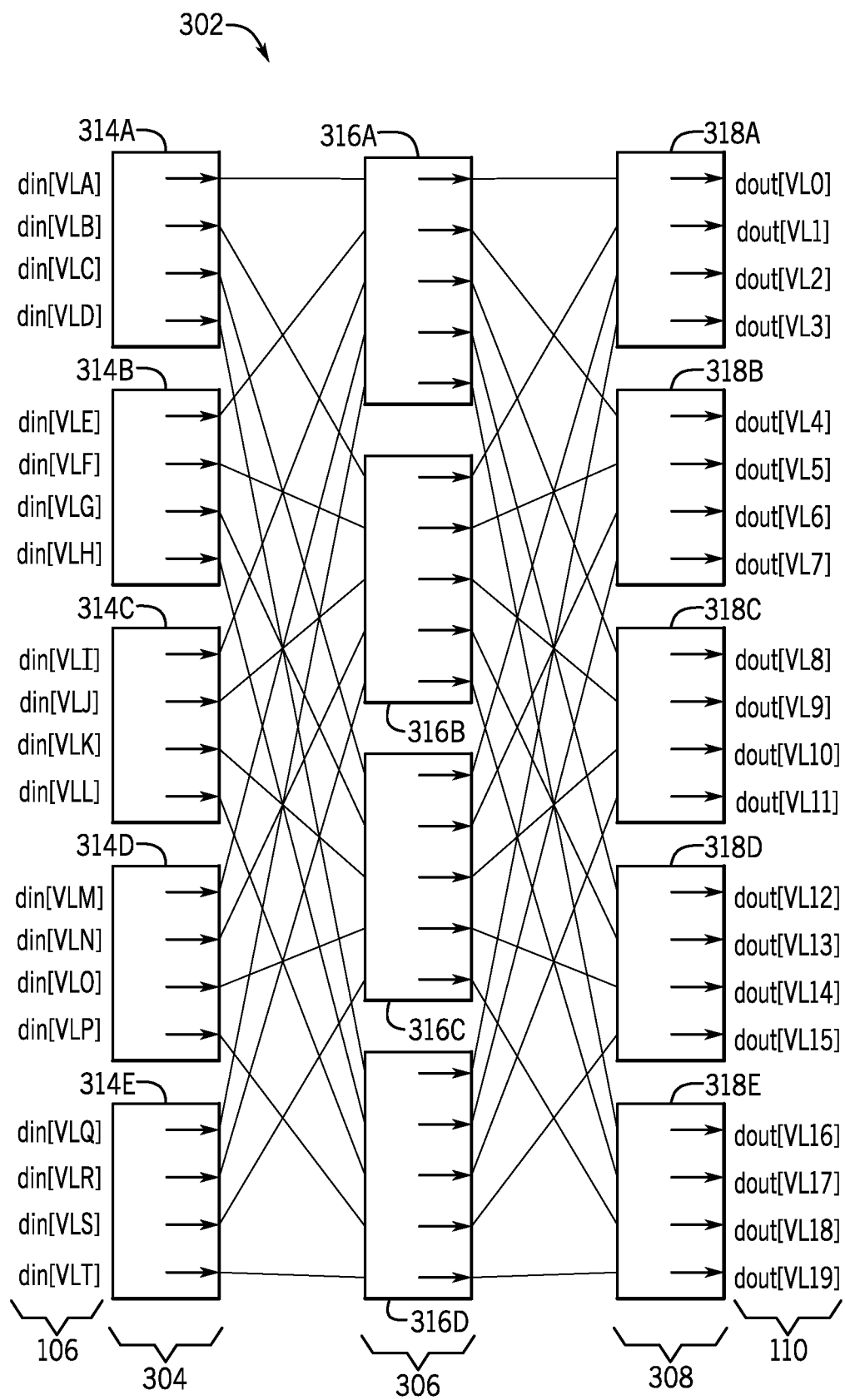
FIG. 8A is a diagram of a Clos network that may be used by a network interface such as that of FIG. 2, in accordance with an embodiment.

A diagram of the Clos network 302 is illustrated in FIGS. 8A, 8B, 8C, and 8D. While the descriptions are related to a 20×20 Clos network (i.e., a Clos network with 20 inputs and 20 outputs), it should be understood that the methods and systems described herein may be used in to control other types of Clos networks or crossbar networks, and Clos networks of any dimensions. Generally, Clos network may include three-stage of crossbars, which may be specified by integer numbers M, N, and R. The diagram illustrated in FIG. 8A provides an overview of the internal architecture of a Clos network 302. The Clos network 302 may have an ingress stage 304, having R crossbars with dimension N×M, a middle stage 306 having M crossbars with dimension R×R, and an egress stage 308 having R crossbars with dimension M×N. The number of inputs and outputs of the Clos network may be R×N.

In the example, the 20 virtual lanes may be ordered by using a Clos network in which R=5, N=4, and M=4. As such the ingress stage may have R=5 ingress crossbars 314A, 314B, 314C, 314D, and 314E, in an N×M (N=4, M=4) configuration. The middle stage 306 may have M=4 crossbars 316A, 316B, 316C, and 316D in an R×R (R=5) configuration. The egress stage 308 may have R=5 egress crossbars 318A, 318B, 318C, 318D, and 318E in an M×N (M=4, N=4) configuration. It should be noted that as long as M≥N, the configuration may be a re-arrangeable non-blocking configuration, and as such, a backtracking recursion solution that satisfies any input/output mapping exists, as understood in the art.

Figure 8B:
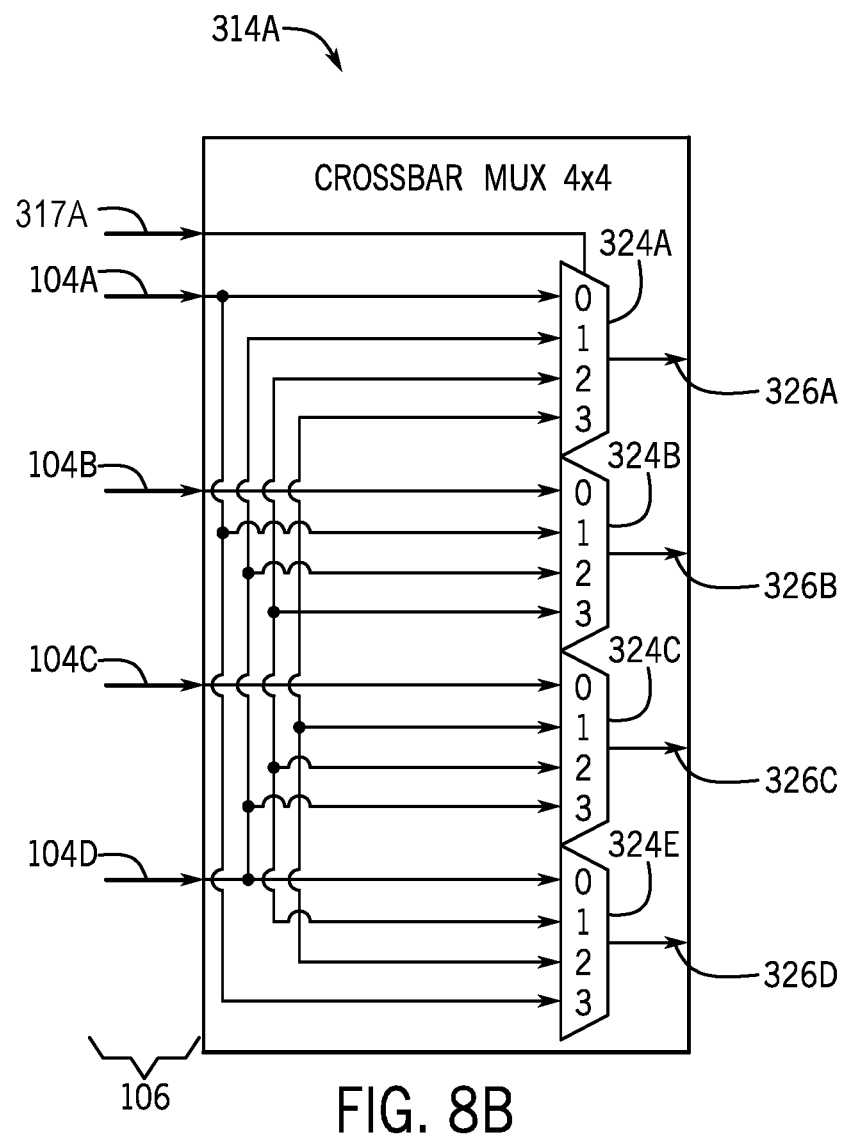
FIG. 8B is a diagram of a crossbar of the ingress stage of the Clos network of FIG. 8A, in accordance with an embodiment.

The crossbars of the Clos network may be formed by use of smaller crossbars and/or multiplexers arranged in multiple stages. As a result of the reduction in the complexity of the constituents, the Clos network may be implemented in FPGAs and ASICs by, for example, employing available library packages that include the crossbar and/or the multiplexers. The diagram in FIG. 8B illustrates an ingress crossbar 314A. Ingress crossbar 314A may receive a control signal 315A, as well as the first four inputs 104A, 104B, 104C, and 104D of the incoming virtual lanes 106. The control signal 315A may be used to configure the multiplexers 324A, 324B, 324C, and 324D of the crossbar 314A. Each multiplexer is associated with an output. Multiplexer 324A, 324B, 324C, and 324D may be associated to the output 326A, 326B, 326C, 326D, respectively. It should be noted that each output may be provided to a crossbar of the middle stage 306. As the architecture allows any of the inputs 104A-D to be mapped to any of the outputs 326A-D, ingress crossbar 314A is capable of routing one of its inputs to any one multiplexer of the middle stage 306. It should be noted that the crossbars 314B-E may be configured similarly to the illustrated crossbar 314A (details omitted for brevity). As a result of the crossbar architecture, all inputs that arrive at the ingress stage 304 may be mapped to a single crossbar of the middle stage 306.

Figure 8C:
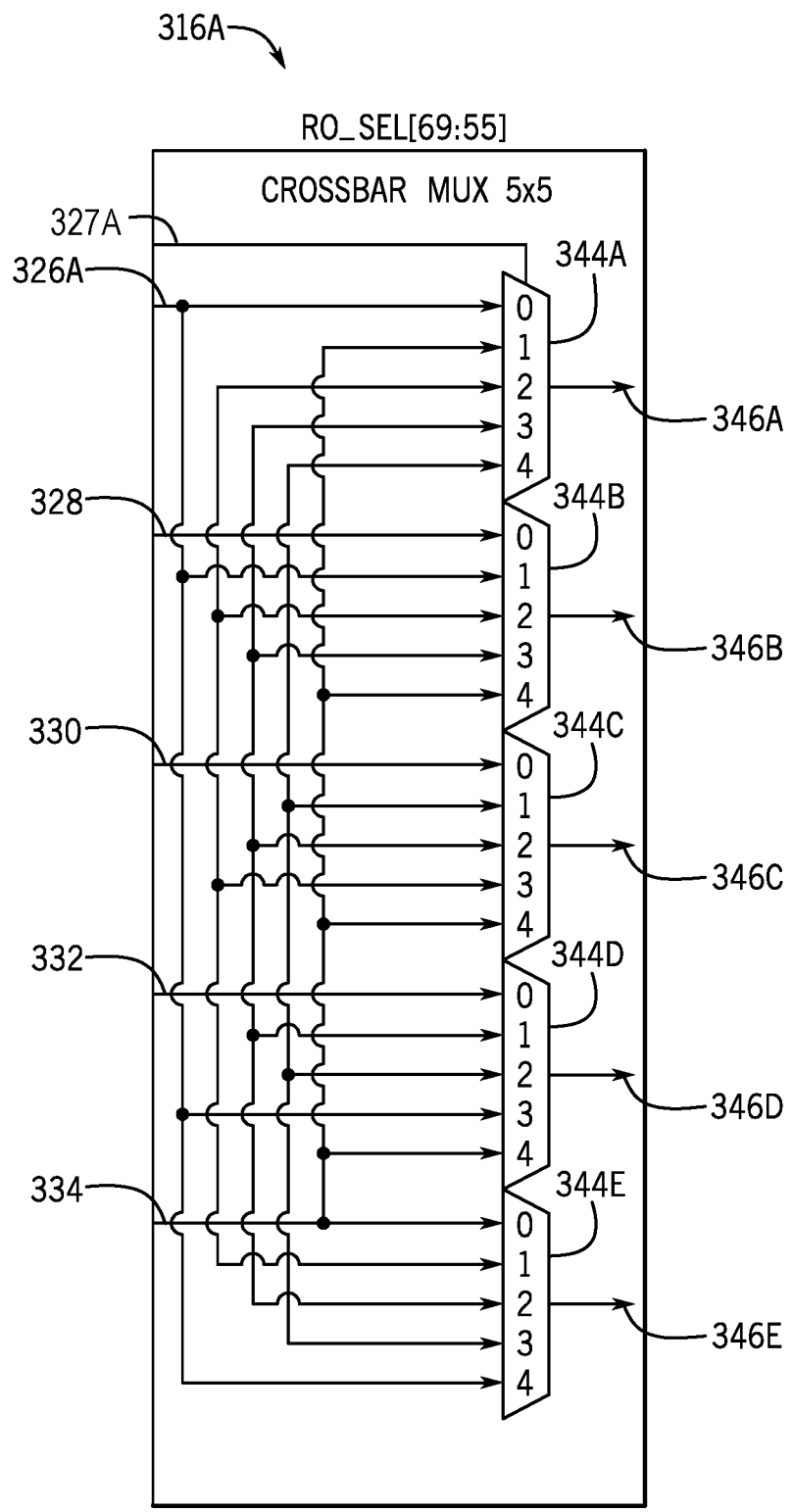
FIG. 8C is a diagram of a crossbar of the middle stage of the Clos network of FIG. 8A, in accordance with an embodiment.

The diagram in FIG. 8C illustrates a middle stage crossbar 316A. Middle stage crossbar 316A may be an R×R crossbar, in which R=5. Middle stage crossbar 316A may receive a control signal 317A, as well as the outputs from the ingress stage 304. The first input of the middle stage crossbar 316A, 326A may be an output of the first ingress stage crossbar 314A. Similarly, the second output 328 may be an output of the second ingress stage crossbar 314B, the third output 330 may be an output of the third ingress stage crossbar 314C, the fourth input 332 may be an output of the fourth ingress stage crossbar 314D, and the fifth input 334 may be an output of the fifth ingress stage crossbar 314E. Note that each of the inputs of the middle stage 306 may be coupled to a single crossbar from the ingress stage 304. In this example, as the ingress stage 304 includes 5 crossbars 314A-E, each middle stage crossbar may have 5 inputs. The control signal 327A may be used to configure the multiplexers 344A, 344B, 344C, 344D, and 344E of the crossbar 316A. Each multiplexer is associated with an output. Multiplexers 344A, 344B, 344C, and 344D may be associated with outputs 346A, 346B, 346C, 346D, respectively. It should be noted that each output of the crossbar 316A may be provided to a crossbar of the egress stage 308 of the Clos network 302. As the architecture allows any of the inputs 326A, 328, 330, 332, and 334 to be mapped to any of the outputs 346A-E, middle stage crossbar 316A is capable of routing a crossbar of the ingress stage 304 to one crossbar of the egress stage 308. It should be noted that the crossbars 316B-D may be configured similarly to the illustrated crossbar 316A (details omitted for brevity). As a result of this architecture, all inputs that arrive at a crossbar of the ingress stage 304 may be mapped to a crossbar of the egress stage 308 via a crossbar of the middle stage 306.

Figure 8D:
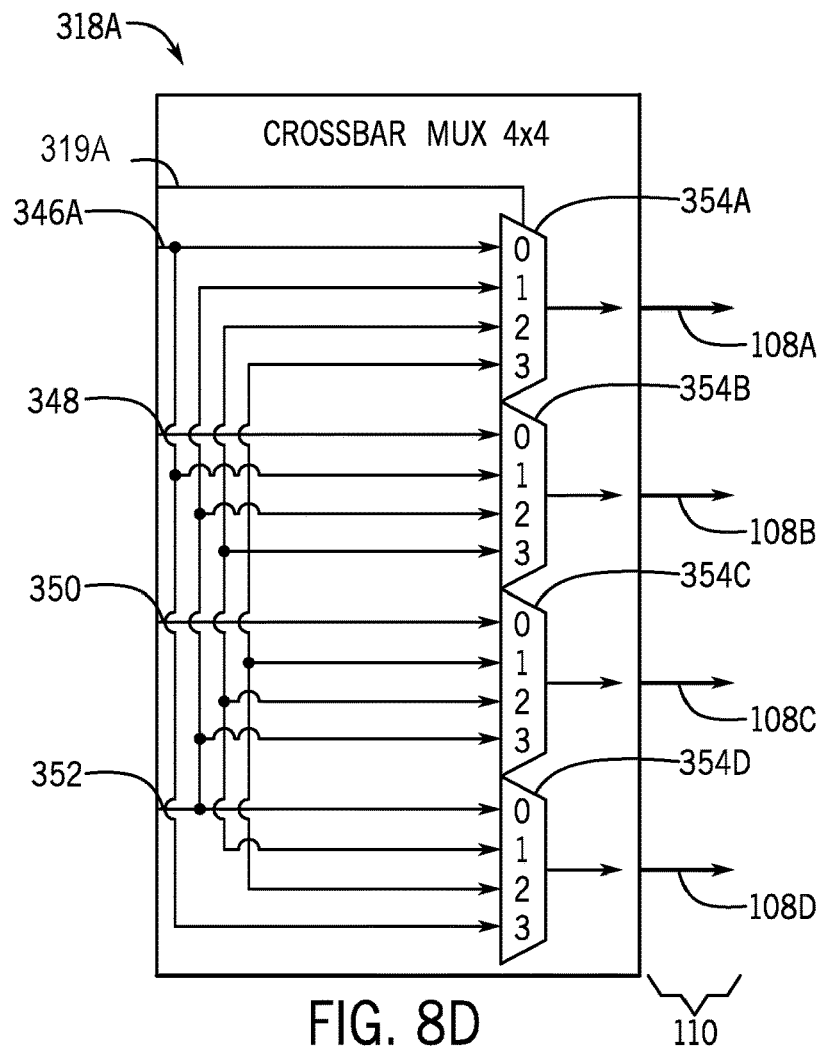
FIG. 8D is a diagram of a crossbar of the egress stage of the Clos network of FIG. 8A, in accordance with an embodiment.

The diagram in FIG. 8D illustrates an ingress stage crossbar 318A. Egress stage crossbar 318A may receive a control signal 319A, as well as the outputs from middle stage 306 of the Clos network 302. The first input of the middle stage crossbar 318A, may be an output 346A of the first middle stage crossbar 316A. Similarly, the second input 348 may be an output of the second middle stage crossbar 316B, the third input 350 may be an output of the third middle stage crossbar 316C, and the fourth input 352 may be an output of the fourth middle stage crossbar 316D. The control signal 319A may be used to configure the multiplexers 354A, 354B, 354C, and 354D of the crossbar 318A. Each multiplexer is associated with a lane from the ordered virtual lanes 110 output of the Clos network 302. Multiplexer 354A, 354B, 354C, and 354D may be associated to the first four virtual lanes 108A, 108B, 108C, and 108D, respectively. It should be noted that the crossbars 318B-E may be configured similarly to the illustrated crossbar 318A (details omitted for brevity).

Note that, in the Clos network 302, each input virtual lane is associated with a crossbar of the ingress stage 304 and each output virtual lane is associated with a crossbar of the egress stage 308. Moreover, note that each crossbar of the middle stage 306 can be configured to connect to a crossbar of the ingress stage 304 once and to a crossbar of the egress stage 308 once. As such, each connection between a middle stage 306 crossbar and a crossbar of the ingress stage 304 and egress stage 308 is a resource to be distributed, and thus the Clos network controller 305 may assign routes for lane reordering by adequately distributing these resources.

Figure 9:
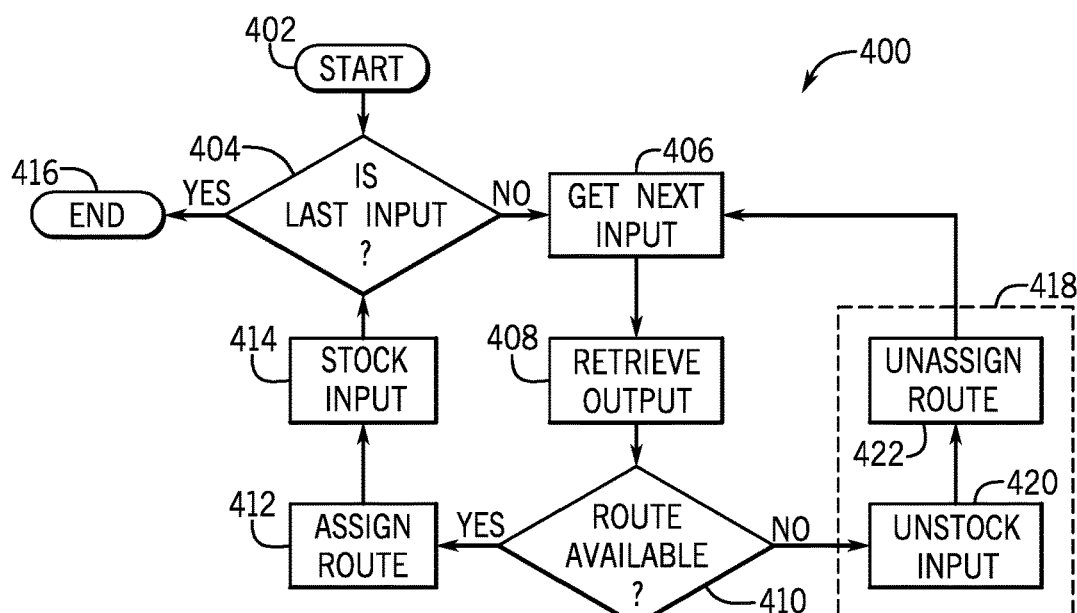
FIG. 9 is a flow chart of a method for determining routes in the Clos network of FIG. 8A for virtual lane reordering, in accordance with an embodiment.

The flow chart of FIG. 9 illustrates a method 400 to distribute the routes through middle stage 306 using a backtracking method. This method may be performed by a state-machine in the Clos network controller 305. As discussed above, the Clos network controller may assign a route in the Clos network 302 for each virtual lane of the input virtual lanes 106 to provide ordered virtual lanes 108. Method 400 may process each input virtual lane and its position within the ingress virtual lanes 106 in an iterative manner. The input for method 400 may be the sequence of the lanes in the ingress virtual lanes 106. For example, the sequence that corresponds to the illustration of FIG. 2 may be (VL12, VL14, VL3, VL5, VL7, . . . , VL0, VL19). The input for method 400 may be the sequence of the positions of the lane. For example, omitting inputs not illustrated in FIG. 2, a position sequence corresponding to the illustration of FIG. 2 may be (VL0, VL3, VL5, VL7, VL12, VL14, VL19)=(19,3,4,5,1,2,20), i.e., the lane VL0 is at the 19th position, VL3 is at the 3rd position, etc.

After beginning (block 402), the method may retrieve the next input (block 406), which may be the position of the next incoming virtual lane or the number of the next virtual lane. Based on the input, the specific ingress crossbar may be determined. In block 408, the output that corresponds to the input may be determined. Based on the output, the specific egress crossbar may be determined. In the decision 410, the method 400 may determine whether a middle stage crossbar is available to route the specific ingress crossbar chosen in block 406 and the egress crossbar chosen in block 408. This decision may take place by using an availability vector, a data structure associated with each ingress crossbar and each egress crossbar that stores the list of available (e.g., unused, unassigned, deassigned) middle stage crossbars.

In the example illustrated in in FIG. 8A, in which the middle stage 306 include 4 crossbars, the availability vector may be a 4-bit vector in which each bit stores information about whether a middle stage crossbar was assigned to route an ingress stage crossbar to an egress stage crossbar. In an implementation that employs the availability vector, the decision 410 may take place by performing an operation with the vectors (e.g., a bit-wise OR, AND, NOR, or NAND) to quickly identify the availability of the route. In deciding whether a route is available, the method 400 may remove some available routes by consulting a backtracking vector, a data structure that preserves a list of previously attempted routes, to prevent infinite loops during backtracking. An example of an implementation of the availability vector and the decision operation is detailed with respect to FIGS. 10A-C, below.

If there is an available route, method 400 assigns the route (block 412). In situation where there is more than one available route, the method 400 may choose any available route, which may be the route through the lowest-order middle stage crossbar. Method 400 may update the availability vectors based on the assignment, and may store the input in an assignment stack (block 414). The stack may be a first-in-first-out (FIFO) data structure or a first-in-last-out (FILO) data structure. Once the assignment of the current input is finished, the method 400 proceeds through the decision 415 and retrieves the next input (block 406) unless all inputs have been processed. If all inputs have been assigned, the decision 415 may lead to the end of method 400 (block 416), and the Clos network may begin its virtual lane reordering operation.

Following decision 410, if there is no route available, processing of the current input may halt, and method 400 may enter a backtrack process 418. The backtrack process 418 may remove a previously assigned input from the assignment stack (block 420). The removed input may be the last assigned input (e.g., if the assignment stack is a FILO) or may be the first assigned input (e.g., if the assignment stack is a FIFO). The route taken by the removed input may also be de-assigned by updating the corresponding availability vectors, and the route may be added to the backtracking vector associated with that input (block 422). Following the backtrack process 418, the method proceeds by retrieving a de-assigned input (block 406), which in some implementations may be the removed input removed during the backtrack process 418. An example of the backtrack process 418 is illustrated in FIGS. 11A-D, discussed below. As discussed above, method 400 is proven to terminate as long as the Clos network conditions (i.e., M≥N) are satisfied.

Figure 10C:
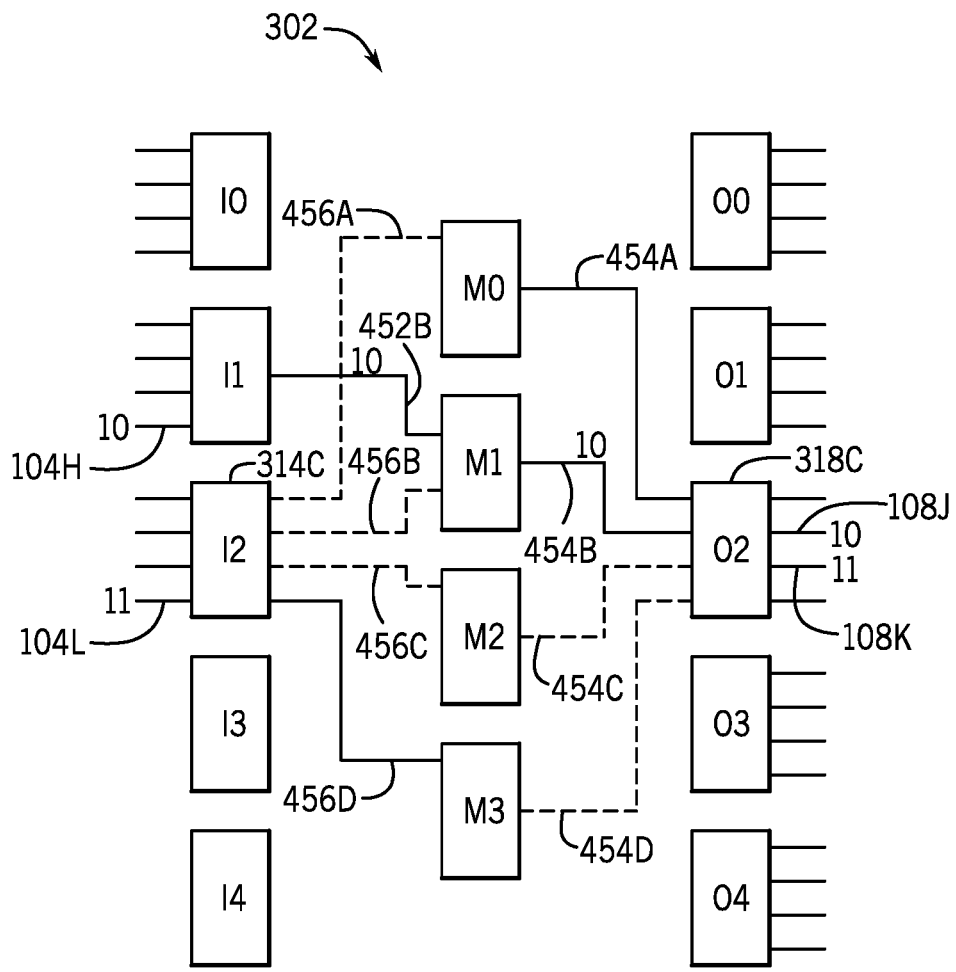
FIG. 10C is a third diagram of the forward search example of FIG. 10A, in accordance with an embodiment.

The diagrams in FIGS. 10A, 10B, and 10C illustrate, by means of an example, the assignment process of a route in Clos network 302 that may be performed by the Clos network controller 305. The example illustrates the assignment of routes for VL10, and VL11. The dashed routes (e.g., 452B, 452C, 454B, 454C, 454D) may correspond to available routes, whereas full lines (e.g., 452A, 452D, 454A) may correspond to previously assigned routes. In this example, VL10 may arrive at input lane 104H, in ingress crossbar 314B. Virtual lane VL10 should be routed to output lane 108J, in egress crossbar 318C. By inspection, it can be noted that routes through crossbars 316B and 316C are available.

The controller may determine route availability by using the above-discussed availability vectors. Each crossbar of the ingress stage 304 and egress stage 308 may be associated with an availability vector. In this example, the availability vector associated with crossbar 314B may be a four bit vector I1=(1,0,0,1), which informs that routes 452A to crossbar 316A, and 452D to crossbar 316D are occupied, and that routes 452B to crossbar 316B and 452C to crossbar 316C are available. Similarly, the availability vector associated with crossbar 318C may be a four bit vector O2=(1, 0,0,0), which informs that route 454A to crossbar 316A is occupied, and that routes 454B, 454C, and 454D to crossbars 316B, 316C, and 316D, respectively, are available. Note that an OR operation between the availability vectors associated with the crossbars 314B and 318C, i.e., I1 OR O2=(1,0,0,1), which indicates that crossbars 316B and 316C are available for routing and that crossbars 316A and 316D are not available. In the above-described example, the availability vector may employ a TRUE or '1' to indicate that a route is occupied and FALSE or '0' to indicate that a route is available. As such, the operation to check availability may be OR, as illustrated, or NOR. It should be noted that other implementations may use a different format for the availability vectors. For example, the availability vector may employ a TRUE or '1' to indicate that a route is available and FALSE or '0' to indicate that a route is occupied. In such implementation, the operation to check availability may be a AND or a NAND operation.

The diagram in FIG. 10B illustrates the result of an assignment of the lane VL10 through the crossbar 316B, through routes 452B and 454B. During the assignment, the crossbar 314B availability vector may be updated to I1=(1, 1, 0, 1) and the crossbar 318C availability vector may be updated to O2=(1, 1, 0, 0). FIG. 10C illustrates the assignment of VL11, which may arrive at input 104L in crossbar 314C, and should be routed to input 108K in crossbar 318C. In the example, the availability vector associated with crossbar 314C is I2=(0, 0, 0, 1), which corresponds to routes 456A, 456B, and 456C being available, and route 456D being assigned. Following the assignment of virtual lane VL10, the availability vector associated with crossbar 318C may be O2=(1, 1, 0, 0) and as such the OR operation I2 OR O2=(1, 1, 0, 1), which indicates that crossbar 316C is available for routing, and thus a route through crossbar 316C may be assigned to VL11.

Figure 11B:
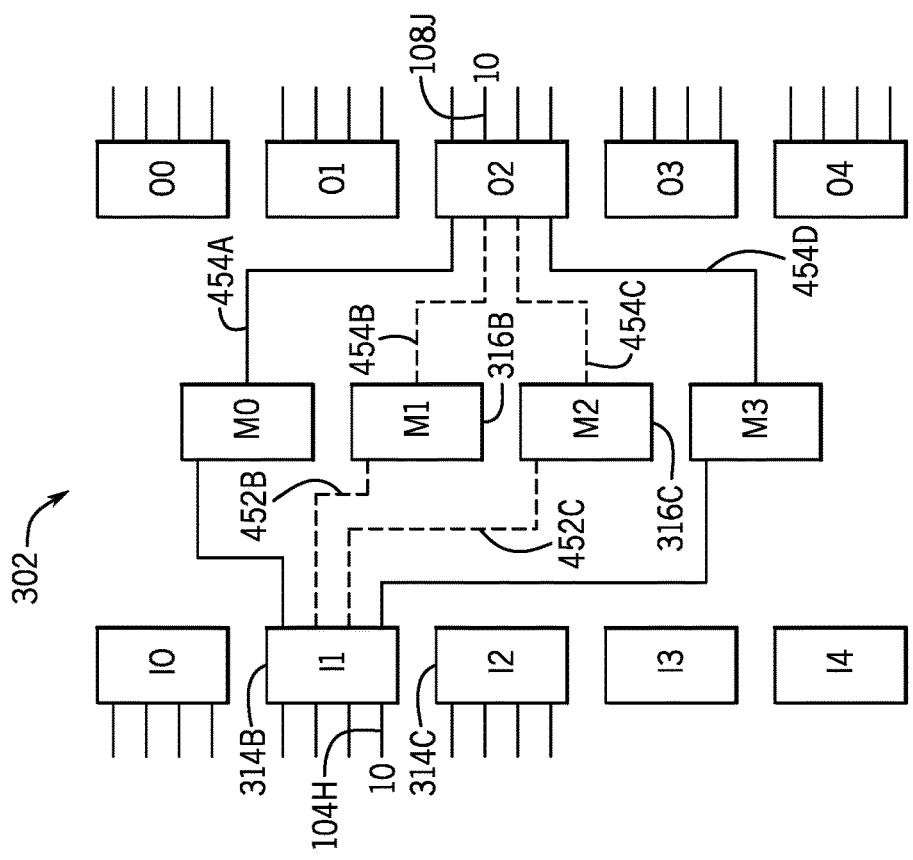
FIG. 11B is a second diagram of the backtracking example of FIG. 11A, in accordance with an embodiment.
Figure 11A:
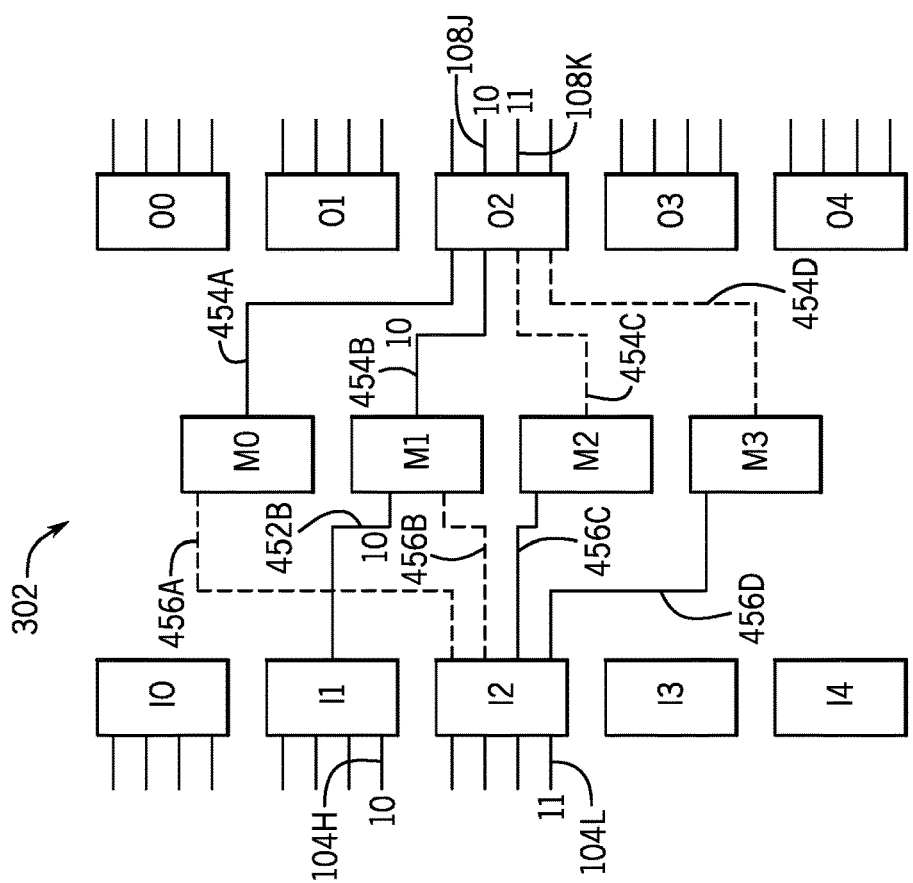
FIG. 11A is a first diagram of an example of backtracking of routes in the Clos network, in accordance with an embodiment.
Figure 11D:
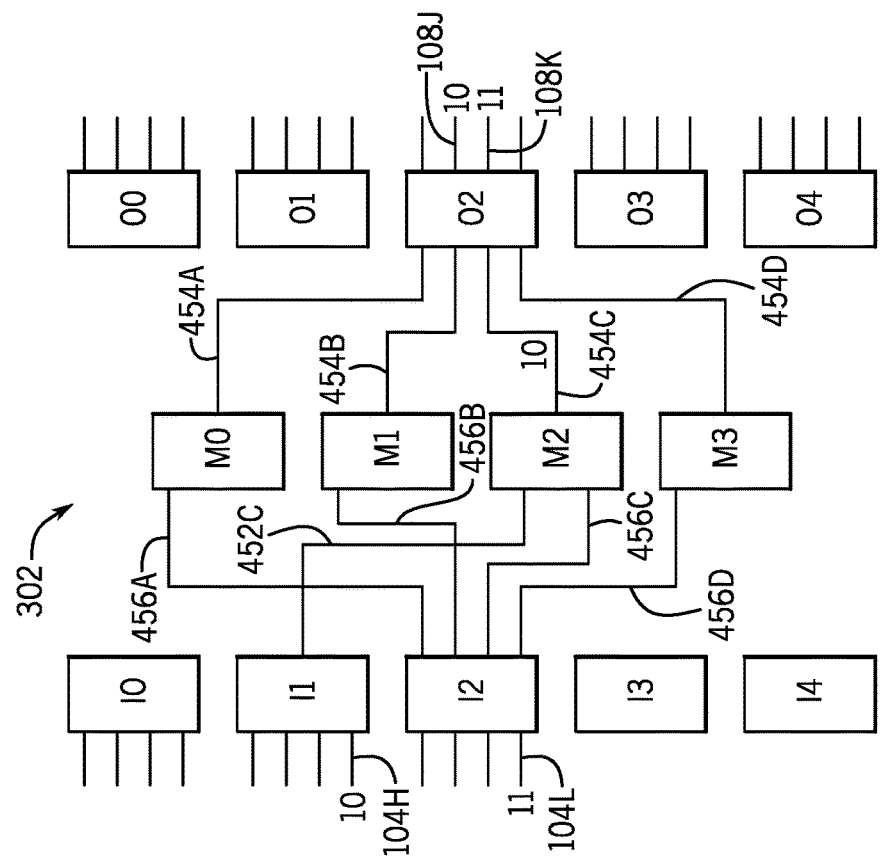
FIG. 11D is a fourth diagram of the backtracking example of FIG. 11A, in accordance with an embodiment.
Figure 11C:
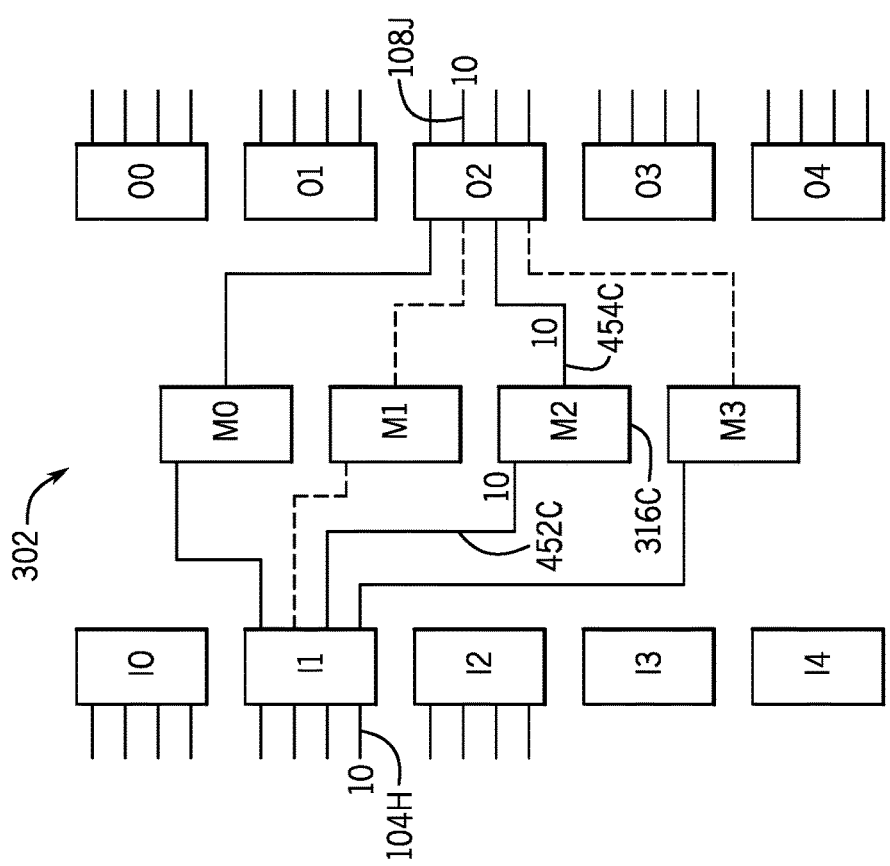
FIG. 11C is a third diagram of the backtracking example of FIG. 11A, in accordance with an embodiment.

As discussed above, backtracking may take place when an unavailable route appears. An example of backtracking is illustrated in FIGS. 11A-C. In this example, the assignment stack operates in a FILO strategy, and the example illustrates a collision during an assignment of VL11, following the assignment of VL10. FIG. 11A illustrates a state of the Clos network 302 following the assignment of VL10 through crossbar 316B using routes 452B and 454B. The virtual lane VL11 arrives at input 104L in crossbar 314C. The virtual lane VL11 should be routed to output 108K in crossbar 318C. As illustrated by the dashed lines, the assignment vector for crossbar 314C may be I2=(0,0,1,1) and the assignment vector for crossbar 318C may be O2=(1,1,0,0). Thus, the result of the OR operation between the assignment vectors is I2 OR O2=(1, 1, 1, 1), which indicates that no available crossbar may be used.

As there is no available route, a backtrack process may be initiated. Due to the FILO strategy, the most recent assigned route, VL10, may be de-assigned, as illustrated in FIG. 11B. This may take place by changing the I1 vector from I1=(1, 1,0,1) to I1=(1,0,0,1) and changing the O2 vector from O2=(1,1,0,0) to O2=(1,0,0,0). A backtrack vector associated with VL10 which may be edited to prevent rerouting of VL10 through crossbar 316B, as discussed above. Following the un-assignment, a new route for VL10 may be sought using the operation I1 OR O2=(1, 0, 0, 1), indicating that crossbars 316B and 316C are available. As crossbar 316B may be in the backtrack vector, VL10 should be routed through crossbar 316C to prevent infinite loops, as illustrated in FIG. 11C. VL10 now employs routes 452B and 454C, resulting in I1=(1, 0, 1, 1) and O2=(1, 0, 1, 0). The controller may proceed to assign VL11. In this second attempt at assigning VL11, the operation performed becomes I2 OR O2=(1, 0, 1, 1), indicating that crossbar 316B may be used, as illustrated in FIG. 11D.

The systems and methods described herein may be used to generate Clos network controllers that may be implemented using state-machine based logic. Such implementation network may provide efficient use of resources in programmable logic devices. For example, an implementation for reordering of 20 virtual lanes may employ a total of 140 bits to store the connectivity information, with 40 bits used for the 20 4×1 multiplexers in the ingress stage, 60 bits used for the 20 5×1 multiplexers in the middle stage, and 40 bits used for the 20 4×1 multiplexers in the egress stage. Moreover, the availability vectors may take 40 bits (4 bits per crossbar in the ingress stage and 4 bits per crossbar in the egress stage), and the backtracking vector may take at most 80 bits (4 per virtual lane), resulting in a very small memory footprint.

While the state machine that implements the Clos network may have any number of states, embodiments of the Clos network controller may be implemented employing a compact state machine with at most 11 states, which may include states for forward connective search, states for backtracking, and states to provide output and housekeeping functions. Moreover, the implementation allows for efficient execution. In a substantial majority of permutations of the virtual lanes tested in simulation, the number of cycles to calculate the routing was observed to be smaller than 2000 clock cycles, with an average of 350 cycles and a latency of less than 1 ns. A simulation or 10,000 random permutations of the virtual lanes terminated in under 10 minutes of wall-time (e.g., an average of 60 ms per calculation), when operating at 450 MHz.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

Embodiments of the Current Application

Clause A1. An electronic device comprising:
a Clos network in that comprises an ingress stage comprising a plurality of ingress stage crossbars, a middle stage comprising a plurality of middle stage crossbars, and an egress stage comprising a plurality of egress stage crossbars; and
a Clos network controller comprising a state machine configured to, for each de-assigned virtual lane of a plurality of virtual lanes:
identify a respective ingress stage crossbar associated with the respective virtual lane and a respective egress stage crossbar associated with the respective virtual lane;
determine a set of available middle stage crossbars for the respective virtual lane based on the respective ingress stage crossbar to the respective stage crossbar;
if the set of available middle stage crossbars is not empty, assign the respective virtual lane to one available middle stage of the set of available middle stage; and
if the set of available middle stage crossbar is empty, de-assign a previously assigned virtual lane when the set of available middle stage crossbars is empty.

Clause A2. The electronic device of clause A1, wherein the Clos network controller comprises a stack that comprises a list of assigned virtual lanes.

Clause A3. The electronic device of clause A2, wherein the stack comprises a first-in-first-out (FIFO) stack or a first-in-last-out (FILO) stack.

Clause A4. The electronic device of clause A3, wherein assigning the respective virtual lane comprises pushing the respective lane to the stack, and wherein de-assigning the respective virtual lane comprises pulling the previously assigned virtual lane from the stack.

Clause A5. The electronic device of any of clauses A1-A4, wherein the plurality of virtual lanes comprise 20 virtual lanes.

Clause A6. The electronic device of any of clauses A1-A4, wherein the Clos network controller comprises a plurality of availability vectors, wherein each availability vector is associated with a respective ingress crossbar or a respective egress crossbar.

Clause A7. The electronic device of clause A6, wherein determining the set of available middle stage crossbars for the respective virtual lane comprises performing a bit-wise logic operation between a first availability vector associated with the respective ingress stage crossbar and a second availability vector associated with the respective egress stage crossbar, and wherein the logic operation comprises an OR operation, an AND operation, a NOR operation, or a NAND operation.

Clause A8. The electronic device of any of clauses A6 or A7, wherein assigning the respective virtual lane comprises updating a first availability vector associated with the respective ingress stage crossbar and updating a second availability vector associated with the respective egress stage crossbar.

Clause A9. The electronic device of any of clauses A7-A8, wherein de-assigning a previously assigned virtual lane comprises updating a first availability vector associated with the ingress stage crossbar associated with the previously assigned virtual lane and updating a second availability vector associated with the egress stage crossbar associated with the previously assigned virtual lane.

Clause A10. The electronic device of any of clauses A1-A9, comprising a memory coupled to the Clos network controller that comprises at least one data structure used by the Clos network controller.

Clause A11. The electronic device of clause A10, wherein the memory comprises at least one availability vector, an assignment stack and a backtrack stack.

Clause A12. The electronic device of any of clauses A1-A11, comprising receiver circuitry that comprises the Clos network and the Clos network controller.

Clause A13. The electronic device of clause A12, wherein the receiver circuitry comprises a 100 Gigabit Ethernet (100 GE) receiver, or a 40 Gigabit Ethernet (40 GE) receiver.

Clause B1. A non-transient computer readable medium containing program instructions to create, in a programmable logic device, a state machine that comprises a Clos network controller configured to:
receive a first virtual lane specification comprising a specified input port of a Clos network and a specified output port of the Clos network;
identify an ingress crossbar of the Clos network associated with the specified input port;
identify an egress crossbar of the Clos network associated with the specified output port;
search a set of available middle stage crossbars of the Clos network based on the ingress crossbar and the egress crossbar;
if the set of available middle stage crossbars is not empty, assign the first virtual lane specification to a first middle stage crossbar of the set of available middle stage crossbars and add the first virtual lane specification to a stack of assigned virtual lanes; and if the set of available middle stage crossbars is empty, remove a second virtual lane specification from the stack of assigned virtual lanes, and de-assign the second virtual lane specification from a previously assigned second middle stage crossbar.

Clause B2. The non-transient computer readable medium of clause B1, wherein the Clos network controller is controls a Clos network that comprises 20 virtual lanes.

Clause B3. The non-transient computer readable medium of clauses B1 or B2, comprising instructions to create in a programmable logic device a physical coding sublayer (PCS) receiver that comprises a Clos network and the Clos network controller.

Clause B4. The non-transient computer readable medium of any of clauses B1-B3, comprising a soft intellectual property (IP) block that comprises the Clos network controller.

Clause B5. The non-transient computer readable medium of any of clauses B1-B4, wherein the programmable logic device comprises an application-specific integrated circuit (ASIC), a field-programmable gate array (FPGA), or a hybrid integrated circuit that comprises programmable logic and hardened logic, or any combination thereof.

Clause C1. A method to design routes in a Clos network using a state machine, the method comprising:
receiving a plurality of input-to-output specifications, wherein each input-to-output specification comprises a respective input port of the Clos network and a respective output port of the Clos network;
for each input-to-output specification:
determining a respective ingress crossbar of the Clos network associated with the respective input port;
determining a respective egress crossbar of the Clos network associated with the respective output port;
searching a set of available middle stage crossbars of the Clos network that can route the respective ingress crossbar and the respective egress crossbar;
if the set of available middle stage crossbars is not empty:
assigning the respective input-to-output specification to a first middle stage crossbar of the set of available middle stage crossbars; and
adding the respective input-to-output specification a backtrack stack; and
if the set of available middle stage crossbars is empty:
removing a second input-to-output specification from the backtrack stack; and
de-assigning the second input-to-output specification from a previously assigned second middle stage crossbar.

Clause C2. The method of clause C1, wherein searching the set of available middle stage crossbars comprises performing a bit-wise logic operation between a first availability vector associated with the respective ingress stage crossbar and a second availability vector associated with the respective egress stage crossbar.

Clause C3. The method of any of clauses C1 or C2, wherein assigning the respective input-to-output specification comprises updating a first availability vector associated with the respective ingress stage crossbar and updating a second availability vector associated with the respective egress stage crossbar.

Clause C4. The method of any of clauses C1-C3, wherein de-assigning the second input-to-output specification comprises updating a first availability vector associated with the ingress stage crossbar associated with the second input-to-output specification and updating a second availability vector associated with the egress stage crossbar associated with the second input-to-output specification.

Clause D1. An electronic device, comprising a state machine for controlling a Clos network that receives a plurality of virtual lanes, wherein the state machine is configured to, for each de-assigned virtual lane of the plurality of virtual lanes:
identify a respective ingress stage crossbar of the Clos network associated with the respective virtual lane and a respective egress stage crossbar of the Clos network associated with the respective virtual lane;
determine a set of available middle stage of the Clos network crossbars for the respective virtual lane based on the respective ingress stage crossbar to the respective stage crossbar;
if the set of available middle stage crossbars is not empty, assign the respective virtual lane to one available middle stage of the set of available middle stage; and
if the set of available middle stage crossbar is empty, de-assign a previously assigned virtual lane when the set of available middle stage crossbars is empty.

Clause D2. The electronic device of clause D1, wherein the state machine is coupled to a memory that comprises a stack that comprises a list of assigned virtual lanes.

Clause D3. The electronic device of any of clauses D1 or D2, wherein the state machine is coupled to a memory that comprises a plurality of availability vectors, wherein each availability vector is associated with a respective ingress crossbar or a respective egress crossbar.

Clause D4. The electronic device of any of clauses D1-D3, wherein the receiver circuitry comprises a 100 Gigabit Ethernet (100 GE) receiver, or a 40 Gigabit Ethernet (40 GE) receiver.

What is claimed is:
1. An electronic device comprising:
a Clos network that comprises an ingress stage comprising a plurality of ingress stage crossbars, a middle stage comprising a plurality of middle stage crossbars, and an egress stage comprising a plurality of egress stage crossbars; and
a Clos network controller comprising a state machine configured to, for each de-assigned virtual lane of a plurality of virtual lanes:
identify a respective ingress stage crossbar associated with a respective virtual lane and a respective egress stage crossbar associated with the respective virtual lane;
determine a set of available middle stage crossbars for the respective virtual lane based on the respective ingress stage crossbar to the respective egress stage crossbar;
if the set of available middle stage crossbars is not empty, assign the respective virtual lane to one available middle stage of the set of available middle stage crossbars; and
if the set of available middle stage crossbars is empty, de-assign a previously assigned virtual lane when the set of available middle stage crossbars is empty.

2. The electronic device of claim 1, wherein the Clos network controller comprises a stack that comprises a list of assigned virtual lanes.

3. The electronic device of claim 2, wherein the stack comprises a first-in-first-out (FIFO) stack or a first-in-last-out (FILO) stack.

4. The electronic device of claim 3, wherein assigning the respective virtual lane comprises pushing the respective virtual lane to the stack, and wherein de-assigning the respective virtual lane comprises pulling a previously assigned virtual lane from the stack.

5. The electronic device of claim 1, wherein the plurality of virtual lanes comprises 20 virtual lanes.

6. The electronic device of claim 1, wherein the Clos network controller comprises a plurality of availability vectors, wherein each availability vector is associated with a respective ingress crossbar or a respective egress crossbar.

7. The electronic device of claim 6, wherein determining the set of available middle stage crossbars for the respective virtual lane comprises performing a bit-wise logic operation between a first availability vector associated with the respective ingress stage crossbar and a second availability vector associated with the respective egress stage crossbar, and wherein the bit-wise logic operation comprises an OR operation, an AND operation, a NOR operation, or a NAND operation.

8. The electronic device of claim 6, wherein assigning the respective virtual lane comprises updating a first availability vector associated with the respective ingress stage crossbar and updating a second availability vector associated with the respective egress stage crossbar.

9. The electronic device of claim 6, wherein de-assigning a previously assigned virtual lane comprises updating a first availability vector associated with an ingress stage crossbar associated with the previously assigned virtual lane and updating a second availability vector associated with an egress stage crossbar associated with the previously assigned virtual lane.

10. The electronic device of claim 1, comprising a memory coupled to the Clos network controller that comprises at least one data structure used by the Clos network controller.

11. The electronic device of claim 10, wherein the memory comprises at least one availability vector, an assignment stack and a backtrack stack.

12. The electronic device of claim 1, comprising receiver circuitry that comprises the Clos network and the Clos network controller.

13. The electronic device of claim 12, wherein the receiver circuitry comprises a 100 Gigabit Ethernet (100 GE) receiver or a 40 Gigabit Ethernet (40 GE) receiver.

14. A non-transitory computer readable medium containing program instructions to create, in a programmable logic device, a state machine that comprises a Clos network controller configured to:
receive a first virtual lane specification comprising a specified input port of a Clos network and a specified output port of the Clos network;
identify an ingress crossbar of the Clos network associated with the specified input port;
identify an egress crossbar of the Clos network associated with the specified output port;
search a set of available middle stage crossbars of the Clos network based on the ingress crossbar and the egress crossbar;
if the set of available middle stage crossbars is not empty, assign the first virtual lane specification to a first middle stage crossbar of the set of available middle stage crossbars and add the first virtual lane specification to a stack of assigned virtual lanes; and
if the set of available middle stage crossbars is empty, remove a second virtual lane specification from the stack of assigned virtual lanes, and de-assign the second virtual lane specification from a previously assigned second middle stage crossbar.

15. The non-transitory computer readable medium of claim 14, wherein the Clos network controller controls a Clos network that comprises 20 virtual lanes.

16. The non-transitory computer readable medium of claim 14, comprising instructions to create in the programmable logic device a physical coding sublayer (PCS) receiver that comprises the Clos network and the Clos network controller.

17. The non-transitory computer readable medium of claim 14, comprising a soft intellectual property (IP) block that comprises the Clos network controller.

18. The non-transitory computer readable medium of claim 14, wherein the programmable logic device comprises an application-specific integrated circuit (ASIC), a field-programmable gate array (FPGA), or a hybrid integrated circuit that comprises programmable logic and hardened logic, or any combination thereof.

19. A method to design routes in a Clos network using a state machine, the method comprising:
receiving a plurality of input-to-output specifications, wherein each input-to-output specification comprises a respective input port of the Clos network and a respective output port of the Clos network;
for each input-to-output specification:
determining a respective ingress crossbar of the Clos network associated with the respective input port;
determining a respective egress crossbar of the Clos network associated with the respective output port;
searching a set of available middle stage crossbars of the Clos network that can route the respective ingress crossbar and the respective egress crossbar;
if the set of available middle stage crossbars is not empty:
assigning the respective input-to-output specification of the plurality of input-to-output specifications to a first middle stage crossbar of the set of available middle stage crossbars; and
adding the respective input-to-output specification a backtrack stack; and
if the set of available middle stage crossbars is empty:
removing a second input-to-output specification from the backtrack stack; and
de-assigning the second input-to-output specification from a previously assigned second middle stage crossbar.

20. The method of claim 19, wherein searching the set of available middle stage crossbars comprises performing a bit-wise logic operation between a first availability vector associated with a respective ingress stage crossbar and a second availability vector associated with a respective egress stage crossbar.

21. The method of claim 19, wherein assigning the respective input-to-output specification comprises updating a first availability vector associated with a respective ingress stage crossbar and updating a second availability vector associated with a respective egress stage crossbar.

22. The method of claim 19, wherein de-assigning the second input-to-output specification comprises updating a first availability vector associated with an ingress stage crossbar associated with the second input-to-output specification and updating a second availability vector associated with an egress stage crossbar associated with the second input-to-output specification.

* * * * *